US009953005B2

(12) United States Patent
Varchavtchik et al.

(10) Patent No.: US 9,953,005 B2
(45) Date of Patent: Apr. 24, 2018

(54) DEVICES WITH ASYMMETRIC SAS GENERATION SUPPORT

(71) Applicant: AVAGO TECHNOLOGIES GENERAL IP (SINGAPORE) PTE. LTD., Singapore (SG)

(72) Inventors: Luiz Varchavtchik, Wichita, KS (US); Reid A. Kaufmann, Andover, KS (US); Jason A. Unrein, Wichita, KS (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 261 days.

(21) Appl. No.: 14/624,333

(22) Filed: Feb. 17, 2015

(65) Prior Publication Data

US 2016/0239458 A1 Aug. 18, 2016

(51) Int. Cl.
*H05K 7/10* (2006.01)
*G06F 13/42* (2006.01)
*G06F 13/40* (2006.01)

(52) U.S. Cl.
CPC ...... *G06F 13/4286* (2013.01); *G06F 13/4022* (2013.01); *Y02B 60/1228* (2013.01); *Y02B 60/1235* (2013.01)

(58) Field of Classification Search
CPC .............. G06F 13/4286; G06F 13/4022
USPC ........................................... 710/301
See application file for complete search history.

(56) References Cited

U.S. PATENT DOCUMENTS

| 8,543,762 | B2 | 9/2013 | Nakajima et al. | |
| 8,812,913 | B2 | 8/2014 | Colline | |
| 2014/0019654 | A1* | 1/2014 | Trivedi | G06F 13/387 710/107 |
| 2014/0317437 | A1* | 10/2014 | LeFevre | G06F 11/2033 714/4.11 |
| 2015/0039787 | A1* | 2/2015 | Voorhees | G06F 3/0653 710/17 |
| 2015/0370748 | A1* | 12/2015 | Wakayama | G06F 13/4022 710/106 |

OTHER PUBLICATIONS

Penokie, Information Technology SAS Protocol Layer-3 (SPL-3), Working Draft American National Standard, T10/BSR INCITS 492, Revision 04, Jul. 24, 2013.

* cited by examiner

*Primary Examiner* — Chun Kuan Lee
(74) *Attorney, Agent, or Firm* — Sheridan Ross P.C.

(57) ABSTRACT

Methods and structure for devices that implement multiple versions of the Serial Attached Small Computer System Interface (SAS) protocol. One exemplary embodiment comprises a SAS device that includes at least one physical link (PHY) that supports a specified generation of SAS protocols, and at least one PHY that supports a different generation of SAS protocols and that does not support the specified generation of SAS protocols. The SAs device also includes an Input/Output (I/O) processor able to select a PHY to service a SAS connection, based on the generation of SAS protocols supported by the PHY.

25 Claims, 7 Drawing Sheets

MIXED PORT

BOARD SOLUTION – MIXED PORT

US 9,953,005 B2

DEVICES WITH ASYMMETRIC SAS GENERATION SUPPORT

FIELD OF THE INVENTION

The invention relates generally to the transfer of data, and more specifically to Serially Attached Small Computer System Interface (SAS) systems.

BACKGROUND

SAS architectures can be utilized in order to provide persistent data storage that enables a host to retrieve and/or store vast amounts of information as desired. SAS architectures are often implemented in enclosures, wherein a large number of SAS and/or Serial Advanced Technology Attachment (SATA) storage devices (e.g., hard disks) are packed into a small volume and are interconnected with a storage controller via one or more expanders. Because the available space within an enclosure is limited (e.g., to fit within an industry standard rack), and because each enclosure is limited to a specific heat/power footprint, it remains problematic to implement SAS devices that have enhanced features without exceeding the strict limits placed upon size, power consumption, and heat generation.

SUMMARY

Systems and methods herein provide devices, such as SAS devices, that utilize components designed for different generations of the SAS protocol. For example, a SAS device described herein may include SAS-3 physical links (PHYs) and SAS-2 PHYs, SAS-2 PHYs and SAS-1 PHYs, etc. Each generation of the SAS protocol is correlated with a different power consumption and performance level. Utilizing components designed for different generations of the SAS protocol on the same device ensures that at least some connections will have high performance, while further ensuring that power and heat consumption limits are not exceeded by the device, even when the device includes a large number of PHYs.

One exemplary embodiment comprises a SAS device that includes at least one PHY that supports a specified generation of SAS protocols, and at least one PHY that supports a different generation of SAS protocols and that does not support the specified generation of SAS protocols. The SAS device also includes an Input/Output (I/O) processor able to select a PHY to service a SAS connection, based on the generation of SAS protocols supported by the PHY.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
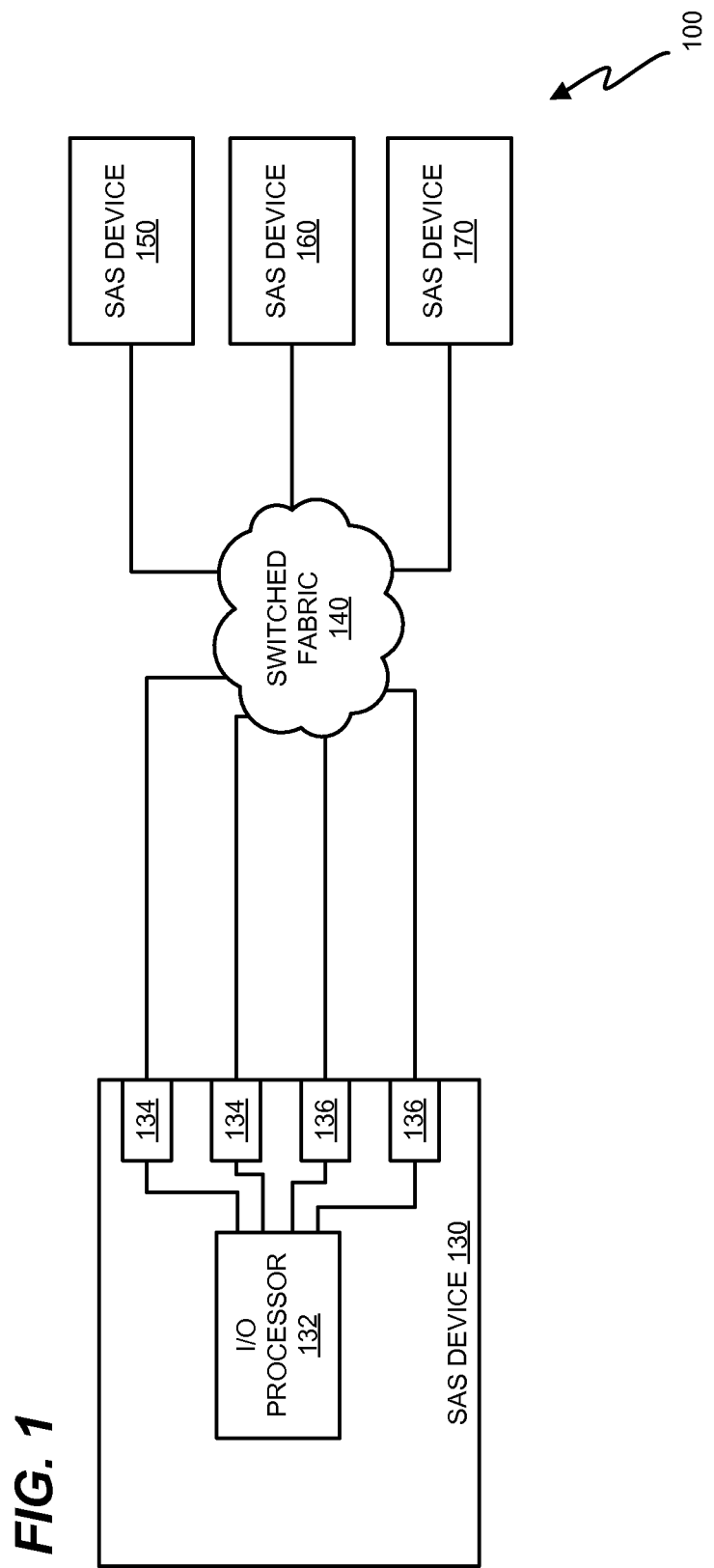
FIG. 1 is a block diagram of an exemplary SAS architecture.

FIG. 1 is a block diagram of an exemplary SAS architecture 100. SAS architecture 100 comprises any combination of components and devices operable to utilize the SAS protocol in order to exchange information. In this embodiment, SAS architecture 100 establishes connections between initiators and targets (known collectively as "end devices") in order to enable SAS Input/Output (I/O) operations to be exchanged between those devices.

SAS architecture 100 includes a plurality of SAS devices 150, 160, and 170, which operate as SAS/SATA targets, and are interconnected via a switched fabric 140 of SAS expanders. In this embodiment, some of the SAS components of architecture 100 are designed for one generation of SAS protocols, while other SAS components are designed for another generation of SAS protocols. As used herein, each "generation" of SAS protocols refers to the integer number used to indicate a version for a given set of SAS standards as defined by the T10 committee. For example, the SAS-1 specifications (and all revisions thereof) are a generation of SAS protocols, the SAS-2 specifications (and all revisions thereof) are another generation of SAS protocols, and the SAS-3 specifications (and all revisions thereof) are yet another generation of SAS protocols. The SAS protocols can include SAS, Serial SCSI Protocol (SSP), SATA Tunneling Protocol (STP), Serial Management Protocol (SMP), etc.

SAS components designed for different generations of the SAS protocol can operate at different frequencies, support different speed negotiation techniques, consume different amounts of power, be sized differently, etc. In many circumstances, devices designed for a newer generation of SAS protocols are backwards-compatible and can communicate using an older generation of SAS protocols, but at a slower maximum link rate (e.g., six Gigabits per second (Gb/s) instead of twelve Gb/s). In contrast, SAS devices designed for an older generation of SAS protocols are incapable of communicating using later generations of the SAS protocols (e.g., an older SAS device can be incapable of supporting a twelve Gb/s link rate). Each subsequent generation of SAS increases transmission speed and adds features that require additional circuitry, and circuitry capable of operating at higher frequencies. Thus, while utilizing legacy components designed for an older generation of SAS protocols at first appears undesirable, it helps to ensure that power consumption is lower than it would be if only the latest generation of SAS components was used. At the same time, the connections serviced by SAS architecture 100 can be tailored in many circumstances to provide performance levels on par with the current generation of SAS protocols.

SAS architecture 100 also includes SAS device 130. SAS device 130 includes multiple SAS PHYs 134 that are compatible with a specified generation of SAS protocols, and further includes multiple SAS PHYs 136 that are compatible with a different generation of SAS protocols. In this embodiment, SAS device 130 comprises a SAS initiator operating as a storage controller that manages logical volumes of stored data. Specifically, in this embodiment SAS device 130 operates as a storage controller that receives host requests (e.g., from a server) and translates those host requests into SAS I/O operations for storing and/or retrieving data for SAS devices 150, 160, and 170, which in this embodiment implement the persistent storage capacity of storage system 100. SAS devices 150, 160, and 170 comprise storage devices such as magnetic hard disks, solid state drives, optical media, etc. compliant with protocols for SAS and/or Serial Advanced Technology Attachment (SATA).

In further embodiments SAS device 130 is implemented as a SAS/SATA target, a SAS expander, etc. Expanders comprise any device capable of establishing point-to-point connections between end devices in accordance with SAS protocols. Many expanders include multiple PHYs that can be coupled with each other via switching circuitry (e.g., a crossbar switch) in order to service connections between different SAS devices.

Within SAS device 130, I/O processor 132 is operable to select a PHY to utilize for a given SAS connection, based on the generation of the SAS protocol supported by that PHY. I/O processor 132 can be implemented as custom circuitry, a processor executing programmed instructions stored in program memory, or some combination thereof. In one embodiment, I/O processor 132 includes a dedicated controller circuit for each generation of SAS protocols supported by the PHYs. For example, in one embodiment I/O processor 132 includes a SAS-2 core circuit directing the operations of SAS-2 PHYs, and further includes a SAS-3 core circuit directing the operations of SAS-3 PHYs. A SAS core comprises circuitry or a processor implementing instructions to operate one or more PHYs in accordance with a given generation of the SAS protocol. The PHY selection techniques applied by I/O processor 132 help to ensure, for example, that a power hungry SAS-3 PHY is not utilized to service a slow connection with a SAS-2 device.

The particular arrangement, number, and configuration of components described herein with regard to FIG. 1 is exemplary and non-limiting. Further details of the operation of SAS architecture 100 will be described with regard to FIG. 2 below.

Figure 2:
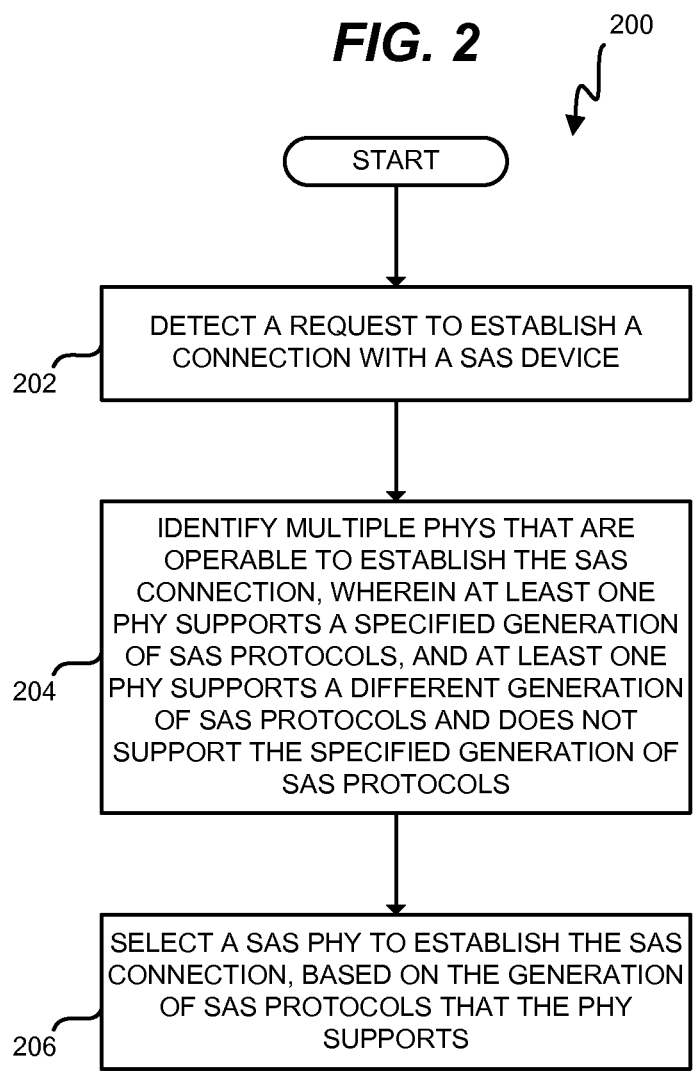
FIG. 2 is a flowchart describing an exemplary method for operating a SAS device.

FIG. 2 is a flowchart describing an exemplary method 200 for operating a SAS device. Assume, for this embodiment, that SAS architecture 100 has initialized and has completed a SAS discovery process. In one embodiment, as a part of this discovery process, each SAS device reports the generation(s) of SAS protocols that it is compatible with, and I/O processor 132 stores a table indicating the generation of SAS protocols supported by each SAS address (or PHY) within SAS architecture 100. After SAS architecture 100 has initialized, its devices attempt to establish SAS connections with each other in order to exchange data (e.g., in order to service requests from a host).

In step 202, I/O processor 132 detects that SAS device 130 has received a request to establish a connection with another SAS device. For example, in one embodiment the request is a host request directed to a Logical Block Address (LBA) of a logical volume managed by SAS device 130 and implemented on SAS devices 150, 160, and 170. I/O processor 132, upon analyzing the host request, can consult logical-to-physical mapping information to determine that a SAS connection should be established with one of SAS devices 150, 160 and 170. In this manner, SAS device 130 can handle requests from outside of SAS architecture 100. In a further embodiment, the request is received as an OPEN Address Frame (OAF) from another SAS device within SAS architecture 100.

In step 204, I/O processor 132 identifies multiple PHYs (e.g., outbound PHYs) at storage device 130 that are operable to establish the requested SAS connection. For example, pathing information such as a routing table can indicate which PHYs are available to provide a pathway to establish the requested SAS connection. In this embodiment, at least one of the available PHYs is compatible with a specified generation of SAS protocols (e.g., SAS-3), while at least one of the available PHYs is compatible with a different generation of SAS protocols (e.g., SAS-2), and is not compatible with the specified generation of SAS protocols.

In step 206, I/O processor 132 selects a PHY to establish the requested connection, based on the generation of SAS protocols that the PHY supports. This decision can be based on a variety of further considerations related to the protocols, including for example which PHYs are presently occupied, the generation of SAS protocols supported by the device the connection will be established with (or the generation of SAS protocols supported by any intervening PHY/device), whether or not a using a given PHY will increase power consumption at SAS device 130 above a predetermined threshold limit, a speed negotiated link rate along each pathway, etc. I/O processor 132 establishes the connection via the selected PHY (e.g., by transmitting an OPEN Accept or an OAF via the selected PHY). Similar techniques to those described above in steps 202-206 can be used by I/O processor 132 to select an entire SAS port to use to establish a SAS connection, and can even be used for wide ports of mixed compatibility (e.g., wide ports that include SAS-2 PHYs and SAS-3 PHYs).

Utilizing the steps of method 200, SAS device 130 is capable of balancing concerns related to performance with concerns related to power usage, by utilizing PHYs that support different generations of the SAS protocols. Even though the steps of method 200 are described with reference to SAS architecture 100 of FIG. 1, method 200 can be performed in other SAS architectures as desired. For example, similar steps may be utilized to identify SAS cores that support different generations of the SAS protocols, and the select a SAS core to direct a connection request to. The steps of the flowcharts described herein are not all inclusive and can include other steps not shown. The steps described herein can also be performed in an alternative order.

Figure 3:
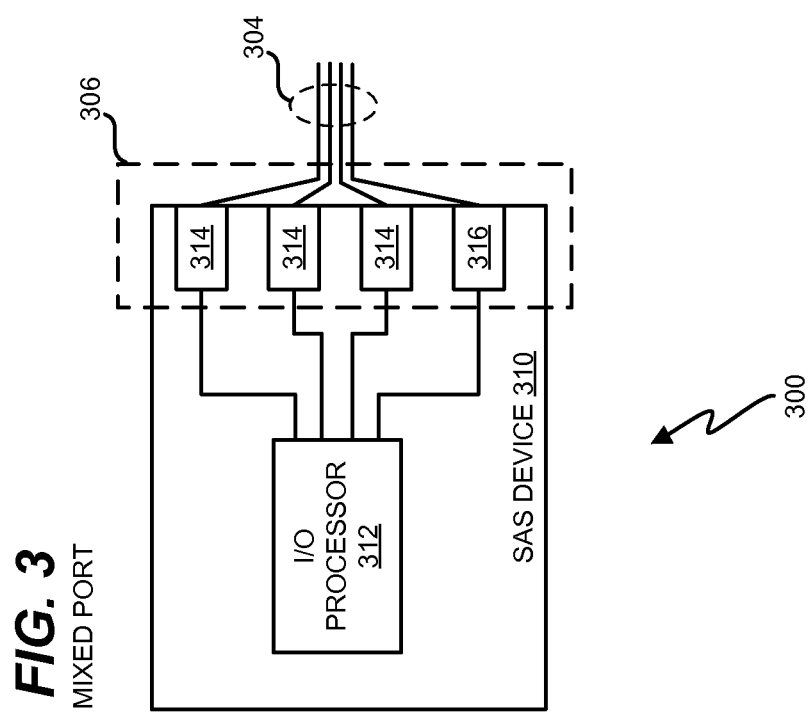
FIG. 3 is a block diagram illustrating an exemplary SAS device utilizing a wide port comprising PHYs compatible with different generations of the SAS protocol.

FIG. 3 is a block diagram 300 illustrating an exemplary SAS device 310 utilizing a "mixed" SAS wide port 306 comprising PHYs compatible with different generations of the SAS protocol. In this embodiment, I/O processor 312 manages wide port 306, which is a ×4 ("by four") wide port that includes three SAS-2 PHYs 314 and a SAS-3 PHY 316. Wide port 306 utilizes a single connector cable 304 comprising multiple individual wires that are bundled together and insulated from electrical interference. In this embodiment, when an outgoing connection will utilize wide port 306, I/O processor 312 dynamically selects a PHY to use to establish a SAS connection (using method 200 above). For example, when an OAF is received at SAS device 310, I/O processor 132 selects an outbound PHY (e.g., at wide port 306) to use to service the request. I/O processor 132 can further decide whether to use a PHY 314 or a PHY 316 based upon the version of the SAS protocols supported by the requesting device or requested device. For example, an OAF can be received for a connection that will utilize a PHY at wide port 306 as an outbound PHY. If the OAF requests only a 6 Gb/s data rate (or a 6 Gb/s rate is the only one supported by all of the devices along the signaling pathway, as determined by a table within SAS device 310), I/O processor 132 selects an older-generation SAS-2 PHY of wide port 306 to service the connection, by forwarding/transmitting the OAF onward to the next SAS device via the selected PHY.

Figure 4:
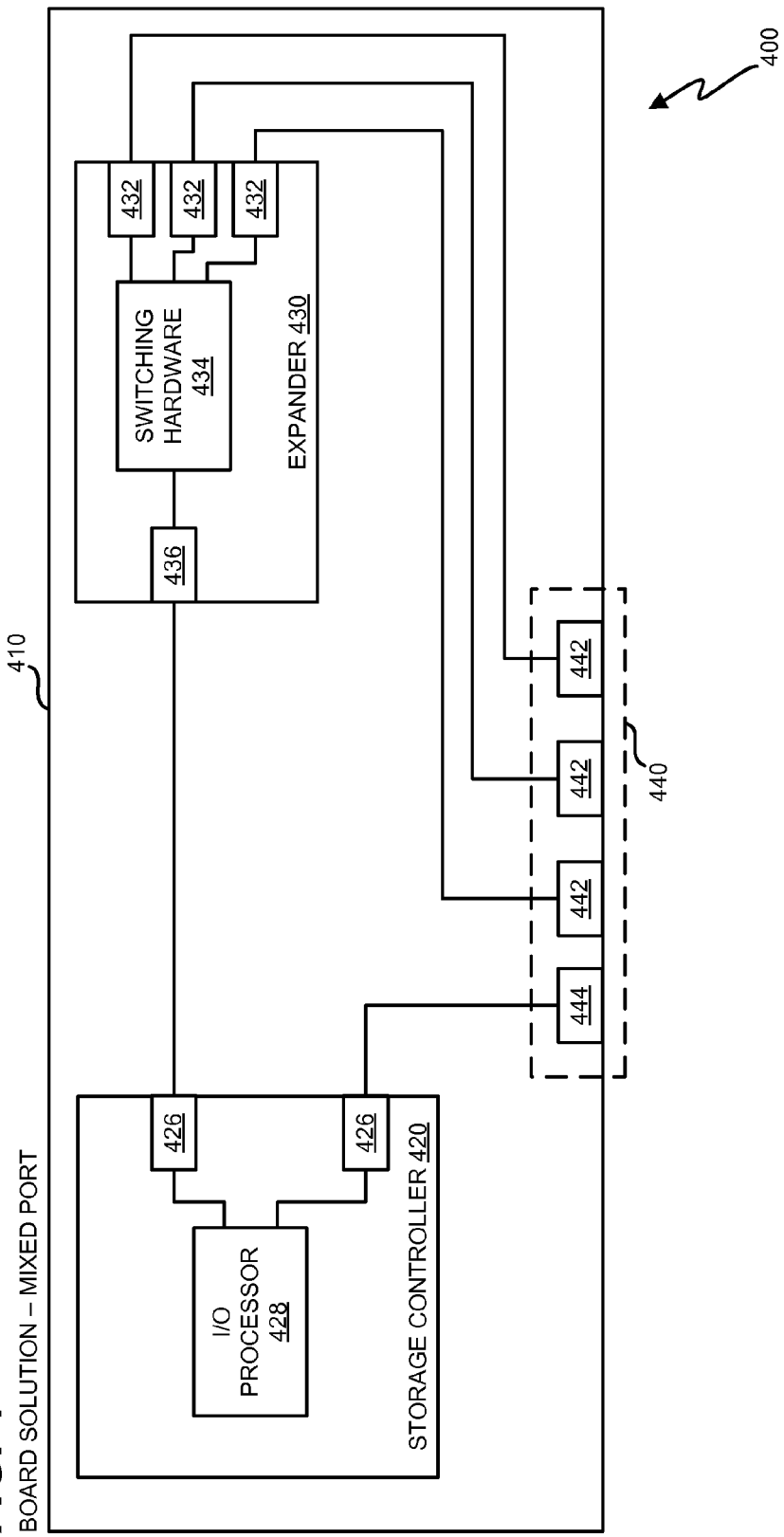
FIG. 4 is a block diagram illustrating an exemplary Host Bus Adapter (HBA) utilizing PHYs that are compatible with different generations of the SAS protocol.

FIG. 4 is a block diagram 400 illustrating an exemplary Host Bus Adapter (HBA) 410 utilizing PHYs that are compatible with different generations of the SAS protocol. In this embodiment, the HBA is implemented on a single printed circuit board as a single integrated device, and includes a storage controller 420 which is coupled with an expander 430. Thus, although HBA is not a single SAS device, such as an expander, initiator, or target, HBA remains a single integrated component/board, and its SAS PHYs of different generations handle connections/traffic for the same SAS domain. Storage controller 420 includes I/O processor 428, and PHYs 426 which are compatible with SAS-3. Expander 430 includes switching hardware 434, as well as PHYs 432 and 436, which are compatible with SAS-2. In this embodiment, HBA 410 further includes wide ports such as wide port 440, which includes a SAS-3 PHY 444 directly coupled with storage controller 420, and multiple SAS-2 PHYs 442 that are directly coupled with SAS expander 430. Additional PHYs of storage controller 420 and expander 430 (not shown) can be exposed internally to the HBA or externally as desired.

Figure 5:
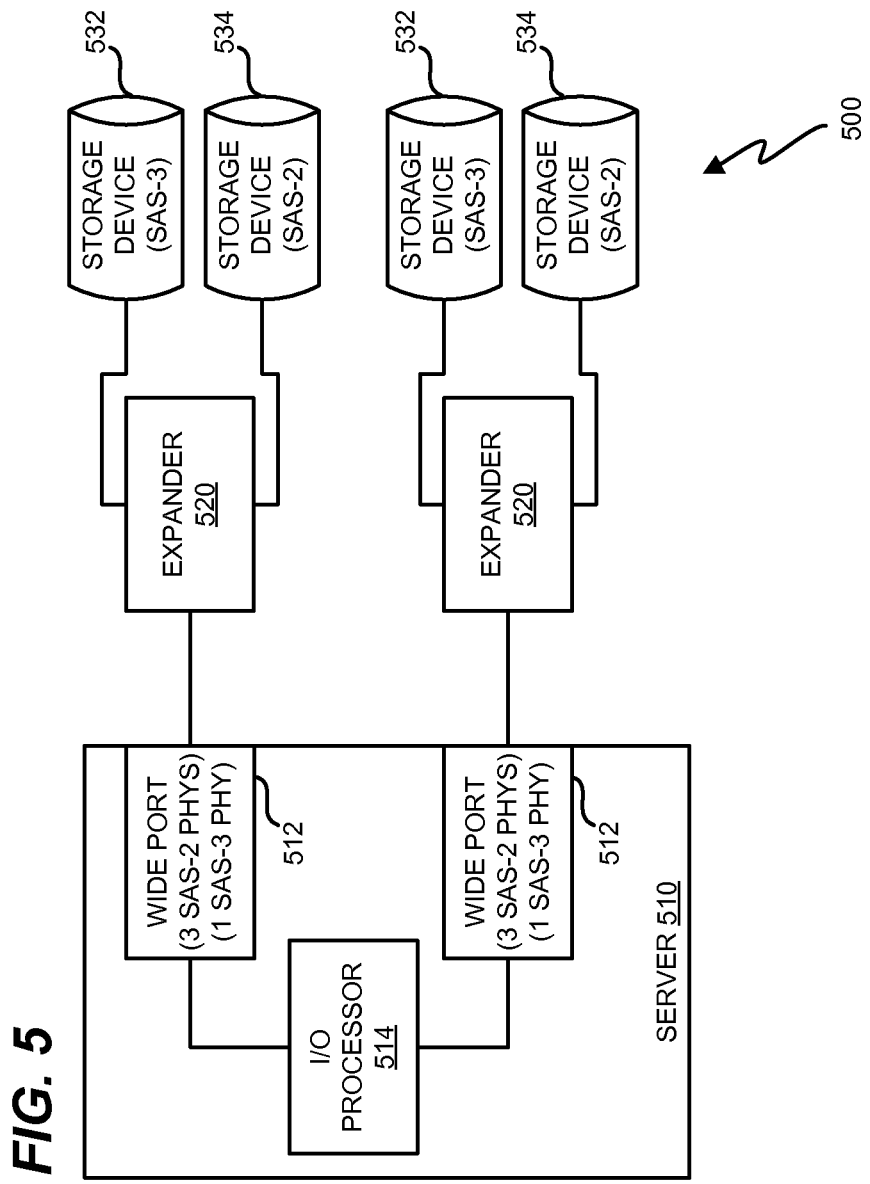
FIG. 5 is a block diagram illustrating an exemplary SAS architecture.
Figure 6:
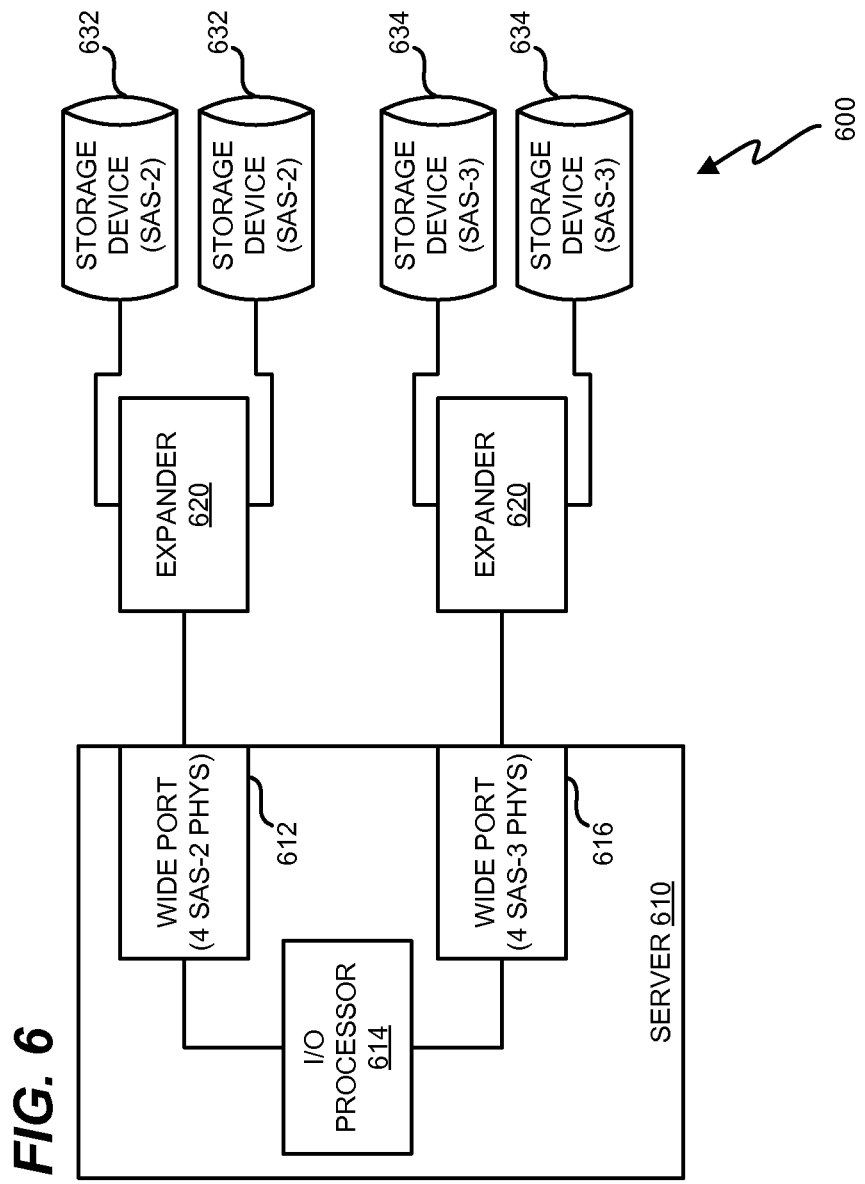
FIG. 6 is a block diagram illustrating a further exemplary SAS architecture.

FIGS. 5-6 illustrate further exemplary SAS architectures and configurations. Specifically, FIG. 5 is a block diagram 500 illustrating a SAS architecture that utilizes mixed ports. According to FIG. 5, server 510 includes an HBA with an I/O processor 514 and multiple wide ports 512. Each wide port 512 includes a SAS-3 PHY and three SAS-2 PHYs. High-speed data for SAS-3 storage devices 532 is exchanged via SAS-3 PHYs of each wide port, while low-speed data for SAS-2 storage devices 534 is exchanged via the SAS-2 PHYs of each wide port. Expanders 520 act as intermediaries between the storage devices and the HBA.

FIG. 6 is a block diagram 600 illustrating a further exemplary SAS architecture which utilizes wide ports that support different generations of the SAS protocol. According to FIG. 6, server 610 includes an integrated HBA SAS device with an I/O processor 614, as well as wide ports 612 and 616. Wide port 612 includes four SAS-2 PHYs, and wide port 616 includes four SAS-3 PHYs. High-speed data for SAS-3 storage devices 634 is exchanged via wide port 616, while low-speed data for SAS-2 storage devices 632 is exchanged via wide port 612. This architecture allows a single HBA to include multiple generations of SAS PHYs, which provides the benefit of increasing port count without degrading performance (because the SAS-2 storage devices 632 would receive no benefit from being coupled with SAS-3 PHYs). Expanders 620 act as intermediaries between the storage devices and the HBA.

EXAMPLES

In the following examples, additional processes, systems, and methods are described in the context of a SAS expander that services SAS connections with other devices in a SAS domain.

Assume, for this example, that SAS device 130 of FIG. 1 is operating to establish and tear down SAS connections, and further assume that SAS device 130 interconnects a variety of end devices. In this example, SAS device 130 includes a crossbar switch, as well as I/O processor 132, which manages the operations of SAS device 130. In this example, whenever an OAF is received at a PHY of the SAS expander, I/O processor 132 consults a SAS routing table to determine which PHYs (represented by a SAS address) are capable of providing a pathway to the requested device (also represented by a SAS address). I/O processor 132 then determines, based on a field of data within the OAF, whether the PHY of the requesting device (or for that matter any PHY along the connection pathway) is designed for SAS-3 or SAS-2 communications. If I/O processor 132 determines that a PHY along the connection pathway will use SAS-2 link rates (e.g., 6 Gb/s or slower), and if I/O processor 132 detects that an outbound SAS-2 PHY is available at the expander to service the connection, then I/O processor 132 operates switching circuitry to establish an electrical connection between the PHY that received the OAF, and forwards the OAF onward towards the requested target device. In this manner, I/O processor 132 selectively saves its SAS-3 PHYs (and their associated power consumption) for high-speed connections.

Figure 7:
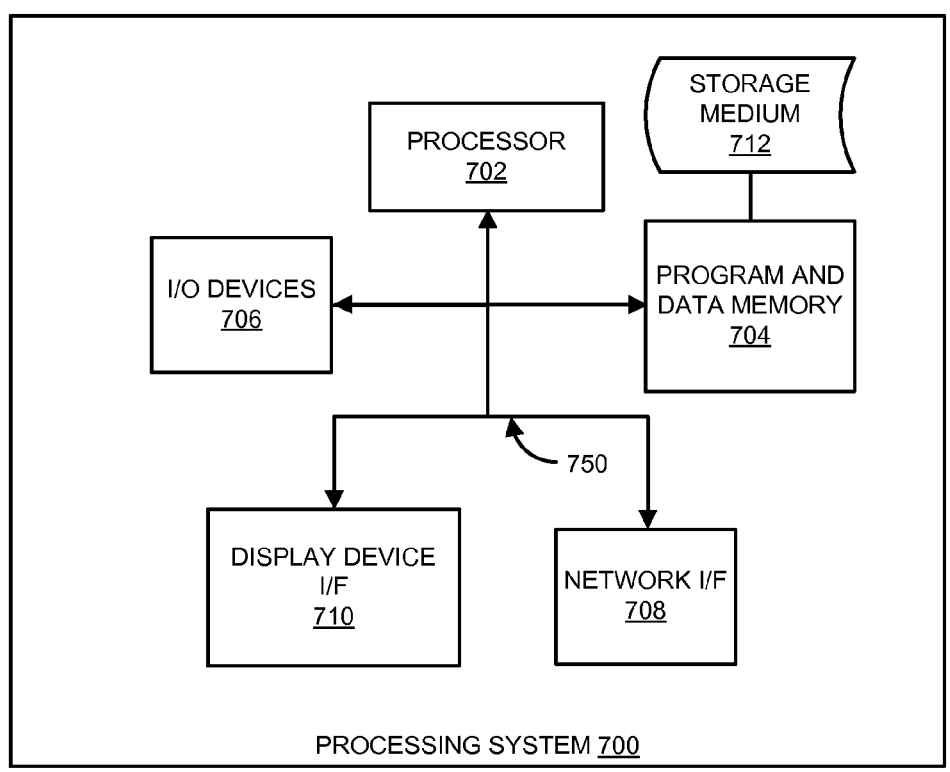
FIG. 7 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of a SAS device to perform the various operations disclosed herein. FIG. 7 illustrates an exemplary processing system 700 operable to execute a computer readable medium embodying programmed instructions. Processing system 700 is operable to perform the above operations by executing programmed instructions tangibly embodied on computer readable storage medium 712. In this regard, embodiments of the invention can take the form of a computer program accessible via computer readable medium 712 providing program code for use by a computer (e.g., processing system 700) or any other instruction execution system. For the purposes of this description, computer readable storage medium 712 can be anything that can contain or store the program for use by the computer (e.g., processing system 700).

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 700, being used for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 can also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 can be integrated with the system to interface to one or more display devices, such as printing systems and screens for presentation of data generated by processor 702.

What is claimed is:

1. A Serial Attached Small Computer System Interface (SAS) device, comprising:
    at least one physical link (PHY) that supports a specified generation of SAS protocols;
    at least one PHY that supports a different generation of SAS protocols having a slower maximum link rate than the generation of SAS protocols, and that does not support the specified generation of SAS protocols; and
    an Input/Output (I/O) processor operable to select the at least one PHY that supports the different generation of SAS protocols to service a SAS connection even though the at least one PHY that supports the specified generation of SAS protocols can also be used to service the SAS connection thereby reserving the at least one PHY that supports the specified generation of SAS protocols to be selected for a future SAS connection that requires a link rate greater than the slower maximum link rate of the at least one PHY that supports the different generation of SAS protocols.

2. The SAS device of claim 1, wherein:
    the specified generation of SAS protocols is SAS-3, and the different generation of SAS protocols is SAS-2.

3. The SAS device of claim 1, wherein:
    the at least one PHY that supports the specified generation of SAS protocols has a maximum link rate of twelve gigabits per second, and the maximum link rate of the at least one PHY that supports the different generation of SAS protocols is six gigabits per second.

4. The SAS device of claim 1, wherein:
    the I/O processor is further operable to select a PHY to service the SAS connection, based on whether other PHYs involved in the SAS connection support the specified generation of SAS protocols.

5. The SAS device of claim 1, wherein:
    the SAS device comprises a storage controller.

6. A Host Bust Adapter (HBA), comprising a circuit board that comprises:
    a Serial Attached Small Computer System Interface (SAS) storage controller circuit that includes physical links (PHYs) that support a specified generation of SAS protocols;
    a SAS expander circuit coupled with the SAS storage controller, wherein the SAS expander circuit includes PHYs that support a different generation of SAS protocols, and that do not support the specified generation of SAS protocols; and
    an Input/Output (I/O) processor operable to select a PHY from the SAS expander circuit to service a SAS connection, based on the generation of SAS protocols supported by the PHY even though the PHYs that support the specified generation of SAS protocols can also be used to service the SAS connection thereby reserving the PHYs that support the specified generation of SAS protocols to be selected for a future SAS connection that utilizes the specified generation of SAS protocols.

7. The HBA of claim 6, wherein:
    the specified generation of SAS protocols is SAS-3, and the different generation of SAS protocols is SAS-2.

8. The HBA of claim 6, wherein:
    the PHYs that support the specified generation of SAS protocols have a maximum link rate of twelve gigabits per second, and the PHYs that support the different generation of SAS protocols have a maximum link rate of six gigabits per second.

9. The HBA of claim 6, wherein:
    the I/O processor is further operable to select a PHY to service a SAS connection, based on whether other PHYs involved in the SAS connection support the specified generation of SAS protocols.

10. The HBA of claim 6, the circuit board further comprising:
    multiple SAS wide ports, each wide port including at least one PHY that supports the specified generation of SAS protocols and is coupled with the SAS storage controller, and each wide port further including at least one PHY that supports the different generation of SAS protocols and is coupled with the SAS expander.

11. A method, operable in a Serial Attached Small Computer System Interface (SAS) device, comprising:
    detecting a request to establish a SAS connection with another SAS device;
    identifying multiple SAS physical links (PHYs) of the SAS device that are operable to establish the SAS connection, wherein at least one of the SAS PHYs supports a specified generation of SAS protocols, at least another one of the SAS PHYs supports a different generation of SAS protocols and does not support the specified generation of SAS protocols; and
    selecting the at least another one of the SAS PHYs to establish the SAS connection even though the PHYs that support the specified generation of SAS protocols can also be used to service the SAS connection thereby reserving the PHYs that support the specified generation of SAS protocols to be selected for a future SAS connection that requires use of the specified generation of SAS protocols.

12. The method of claim 11, wherein:
    the specified generation of SAS protocols is SAS-3, and the different generation of SAS protocols is SAS-2.

13. The method of claim 11, wherein:
    the at least one PHY that supports the specified generation of SAS protocols has a maximum link rate of twelve gigabits per second, and the at least one PHY that supports the different generation of SAS protocols has a maximum link rate of six gigabits per second.

14. The method of claim 11, further comprising:
    selecting a PHY to service a SAS connection, based on a link rate supported by another PHY involved in servicing the SAS connection.

15. The method of claim 11, wherein:
    the SAS device comprises a storage controller.

16. A non-transitory computer readable medium embodying programmed instructions which, when executed by a processor, are operable for performing a method in a Serial Attached Small Computer System Interface (SAS) device, comprising:
    detecting a request to establish a SAS connection with another SAS device;

identifying multiple SAS physical links (PHYs) of the SAS device that are operable to establish the SAS connection, wherein at least one of the SAS PHYs supports a specified generation of SAS protocols, at least another one of the SAS PHYs supports a different generation of SAS protocols and does not support the specified generation of SAS protocols; and selecting the at least another one of the SAS PHYs to establish the SAS connection even though the PHYs that support the specified generation of SAS protocols can also be used to service the SAS connection thereby reserving the PHYs that support the specified generation of SAS protocols to be selected for a future SAS connection that requires use of the specified generation of SAS protocols.

17. The medium of claim 16, wherein:
the specified generation of SAS protocols is SAS-3, and the different generation of SAS protocols is SAS-2.

18. The medium of claim 16, wherein:
the at least one PHY that supports the specified generation of SAS protocols has a maximum link rate of twelve gigabits per second, and the at least one PHY that supports the different generation of SAS protocols has a maximum link rate of six gigabits per second.

19. The medium of claim 16, wherein the method further comprises:
selecting a PHY to service a SAS connection, based on a link rate supported by another PHY involved in servicing the SAS connection.

20. The medium of claim 16, wherein:
the SAS device comprises a storage controller.

21. A Serial Attached Small Computer System Interface (SAS) device, comprising:
a plurality of physical links (PHYs);
a first SAS core operable to direct at least one of the PHYs according to a specified generation of SAS protocols;
a second SAS core operable to direct at least one of the PHYs according to a different generation of SAS protocols, wherein the second SAS core does not support the specified generation of SAS protocols; and
an Input/Output (I/O) processor operable to select the second SAS core to service a SAS connection even though the PHYs of the first SAS core can also be used to service the SAS connection thereby reserving the PHYs of the first SAS to be selected for a future SAS connection that requires use of the specified generation of SAS protocols.

22. The SAS device of claim 21, wherein:
the specified generation of SAS protocols is SAS-3, and the different generation of SAS protocols is SAS-2.

23. The SAS device of claim 21, wherein:
the first SAS core supports maximum link rates of twelve gigabits per second, and the second SAS core supports maximum link rates of six gigabits per second.

24. The SAS device of claim 21, wherein:
the SAS device further comprises an Input/Output (I/O) processor operable to select a PHY to service a SAS connection, based on the SAS core that directs the PHY.

25. The SAS device of claim 21, wherein:
the SAS device comprises a storage controller.

* * * * *